(12) United States Patent
Reinisch et al.

(10) Patent No.: US 6,499,310 B2
(45) Date of Patent: Dec. 31, 2002

(54) FLOW CONTROL DEVICE FOR A GAS STREAM

(75) Inventors: Eric Reinisch, Weinheim (DE); Daniel Dietz, Sonceboz-Sombeval (CH)

(73) Assignees: Behr GmbH & Co., Stuttgart (DE); Sonceboz S.A., Sonceboz (CH)

( * ) Notice: Subject to any disclaimer, the term of this patent is extended or adjusted under 35 U.S.C. 154(b) by 0 days.

(21) Appl. No.: 09/859,892

(22) Filed: May 18, 2001

(65) Prior Publication Data

US 2002/0007642 A1 Jan. 24, 2002

(30) Foreign Application Priority Data

May 18, 2000 (DE) .......................................... 100 24 693

(51) Int. Cl.[7] ................................................. B60H 1/32
(52) U.S. Cl. ............... 62/244; 137/601.09; 137/601.11; 454/335
(58) Field of Search ........................ 62/244; 137/601.11, 137/601.09, 601.08, 601.14; 454/335

(56) References Cited

U.S. PATENT DOCUMENTS

| | | | | |
|---|---|---|---|---|
| 4,184,288 A | * | 1/1980 | Magill et al. | 137/601.09 |
| 4,244,397 A | * | 1/1981 | Magill et al. | 137/601.06 |
| 4,275,762 A | * | 6/1981 | Field | 137/601.11 |
| 5,310,021 A | * | 5/1994 | Hightower | 185/40 R |
| 5,454,757 A | * | 10/1995 | Wirfel | 137/601.08 |
| 5,580,307 A | * | 12/1996 | Arosio et al. | 137/601.09 |
| 5,876,014 A | * | 3/1999 | Noritake et al. | 251/129.12 |
| 5,878,805 A | | 3/1999 | Denk et al. | 165/42 |

FOREIGN PATENT DOCUMENTS

| | | | |
|---|---|---|---|
| DE | 2700928 | * 7/1977 | .......... F16D/00/00 |
| DE | 43 31 384 | 3/1995 | |
| DE | 43 24 912 | 11/1995 | |
| DE | 44 42 000 | 5/1998 | |
| GB | 1 227 855 | 4/1971 | |

OTHER PUBLICATIONS

Specialty News in Electrical Engineering, Section 9.3.6, "Step motor," Publisher: Europa–Lehrmittel, Nourney, Vollmer & Co., oHG, 11 Edition, 1977, pp. 228, 229.

Patent Abstracts of Japan, vol. 1999, No. 4, Apr. 30, 1999 (Apr. 30, 1999) & JP 11 018403.

* cited by examiner

*Primary Examiner*—Harry B. Tanner
*Assistant Examiner*—Mohammad M. Ali
(74) *Attorney, Agent, or Firm*—Foley & Lardner

(57) ABSTRACT

An airflow control device for air streams in a motor vehicle air-conditioning system includes an installation frame with pivotable lamellae (2) that are driven by an electric motor via a gear mechanism arranged on the outside of the frame. The gear mechanism comprises a plurality of cylindrical gearwheels (9 to 12) arranged one above the other, so as to be very narrow and such that the overall dimensions of the housing (5) for the gear mechanism do not exceed the width and height dimensions of the frame (1). This novel arrangement allows integration of the drive as a whole and minimizes the amount of space required.

16 Claims, 3 Drawing Sheets

FLOW CONTROL DEVICE FOR A GAS STREAM

BACKGROUND OF THE INVENTION

The present invention relates to a control device for controlling the air flow of air streams in motor vehicle air-conditioning systems. The device has a frame which can be installed in an air duct, and lamellae which are mounted pivotably in the frame at their ends. The lamellae dimensions are selected such that, in a closed position, they cover the through-passage cross section of the frame. At least one of the lamellae is driven by a cylindrical gearwheel located on an outer side of the frame, and all the lamellae are adjustable in the same direction.

A flow control device of this general type is known from DE 44 42 000 A1, which corresponds to U.S. Pat. No. 5,878,806, the disclosure of which is incorporated herein by reference. If it is the intention for the lamellae to be moved via a drive rather than by hand, then it is necessary, in the case of an electric drive motor, to provide a reduction-gear mechanism which converts the relatively high speed of the electric motor into the necessarily slow pivot movement of the lamellae. Thus, for example, with motor speeds of 700 or 1500 rpm, a reduction to approximately 2 rpm is necessary. This results in bulky gear-mechanism arrangements that take up a lot of space, which is especially at a premium in motor vehicles. Moreover, it is an expensive and complicated task to build in such gear mechanisms and also to connect a motor to said gear mechanism.

In another type of actuating drive (DE 27 00 928 A1), which is provided for controlling the air flaps in heating and air-conditioning systems of buildings, it is known to combine a reduction-gear mechanism combined with an electric motor. The drive unit is contained between parallel plates and is pushed, via a hollow shaft assigned to the last drive gearwheel, onto the spindle of one of the air flaps which is to be driven. The drive unit is borne by the spindle and is secured against rotation. The dimensioning of the gear mechanism is not critical in this case because the constricted spatial conditions of the actuating drives for motor vehicles mentioned in the introduction do not exist here. It is also the case that such drive units have to be attached to the air flaps as a last step, which is not readily possible in the case of flow control devices for controlling air streams in motor vehicle air-conditioning systems.

SUMMARY OF THE INVENTION

One object of the present invention is to provide an improved air flow control device for a motor vehicle heating/air-conditioning system.

Another object of the invention is to provide a more straightforward method of installation for the airflow control device for motor vehicles that has a compact construction which only takes up a small amount of space.

It is also an object of the invention to provide an improved motor vehicle heating/air-conditioning system.

In accomplishing these objects, there has been provided in accordance with one aspect of the present invention an flow control device for controlling an air stream in a motor-vehicle air-conditioning system, comprising: a mounting frame adapted for installation in a duct of a motor vehicle air-conditioning system; a plurality of lamellae mounted pivotably at their ends in the lateral sides of the frame, the lamellae having dimensions selected such that, in a closed position, they close the through-passage cross section of the frame; a connecting member for connecting all of the lamellae together so that they are adjustable in the same direction; an add-on housing detachably connected to one of the lateral sides of the mounting frame to form a compact structural unit therewith; an electric motor mounted in the add-on housing and having a drive output; and a reduction-gear mechanism comprising a plurality of cylindrical gearwheels arranged one above the other and of which the largest diameter is smaller than the axial depth of the frame, the reduction-gear mechanism being operative attached to the drive output of the electric motor and having a final gearwheel that rotatably drives at least one of the lamellae.

In accordance with another aspect of the present invention, there has been provided a motor vehicle air-conditioning system, comprising a housing defining an air flow duct, an evaporator located in the housing, a heater located in the housing and an air flow control device positioned in the air flow duct, wherein the air flow control device comprises a device as described above.

Further objects, features and advantages of the present invention will become apparent from the detailed description of preferred embodiments that follows, when considered together with the accompanying figures of drawing.

DETAILED DESCRIPTION OF PREFERRED EMBODIMENTS

The device according to the invention provides considerable simplification in installation because the entire reduction-gear mechanism including the drive motor can be integrated, as a structural unit, on the installation frame as early as at the stage when the latter is inserted.

The reduction-gear mechanism comprises a plurality of cylindrical gearwheels which are arranged one above the other and of which the axles are preferably and advantageously arranged in a plane that runs parallel to, or coincides with, the plane in which the bearings of the lamellae are also located. This configuration results in a gear mechanism which, although relatively long in one direction, is very narrow widthwise. According to the invention, if the largest diameter of the cylindrical gearwheels is smaller than the frame width, this configuration results particularly in a drive that may be attached in its entirety laterally to one of the side walls of the frame. With this type of construction, the entire drive can be accommodated in an add-on housing which corresponds widthwise to the width of the frame and can be clipped, for example, straightforwardly on the frame.

In a preferred embodiment of the invention, the electric motor provided may be a stepping motor which allows very precise adjustment of the position of the lamellae, and thus also precise adjustment of the gas or air quantity flowing through the control device.

Figure 1:
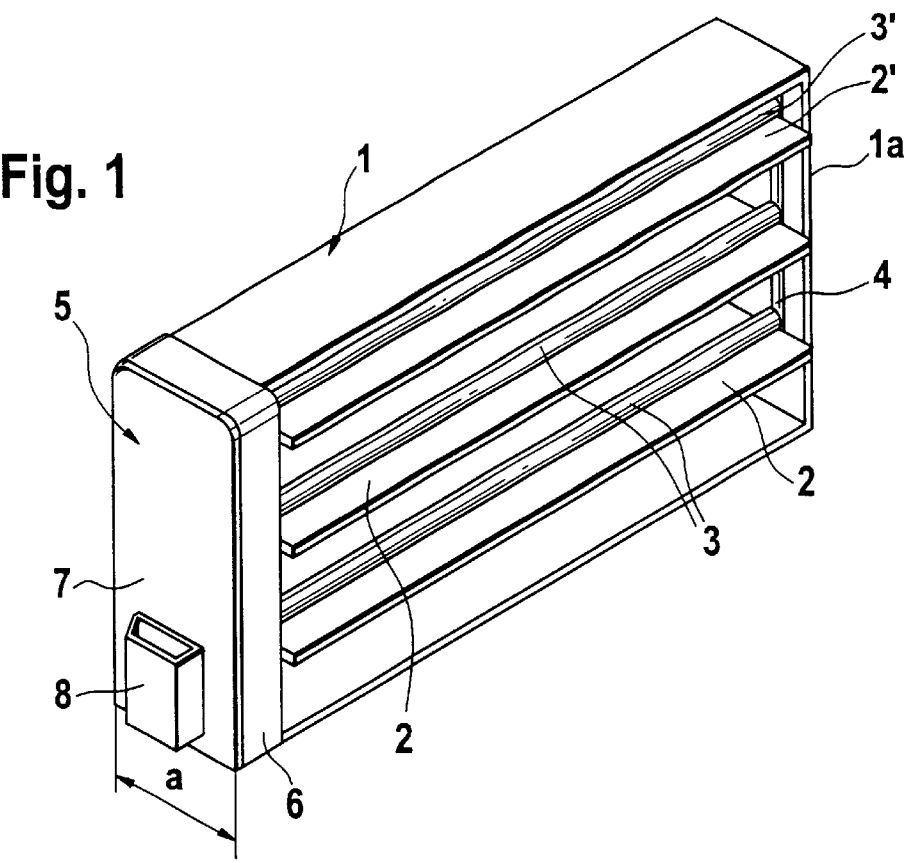
FIG. 1 is a perspective view of one embodiment of an airflow control device according to the invention for installation in an air-conditioning system of a motor vehicle.

The invention is explained hereinbelow and is illustrated by way of several exemplary embodiments set forth in the drawings. It can be seen from FIG. 1, first of all, that the control device intended for installation into an air-flow duct of an air-conditioning system of a motor vehicle comprises a generally rectangular frame 1. In the side walls 1a of frame 1a plurality of flap-like lamellae 2 are mounted such that they can be pivoted through approximately 90° in each case. The lamellae, of which only three are shown in the exemplary embodiment for the sake of simplicity, are each provided in their longitudinal center with a pivot spindle 3. The pivot spindle projects beyond the lamellae at each end and is retained in the side walls 1a in bearings (which are not shown specifically). All the lamellae 2, on one side of their pivot spindles, are connected to a common coupling device in the form of a connecting rod 4, which results in all the lamellae 2 being adjusted in the same direction when one lamella is driven. The lamellae, furthermore, are designed such that, in a closed position, they close the through-passage cross section of the frame 1.

The drive for the lamellae 2 is accommodated in an add-on housing 5 which comprises a shell-like housing part 6 and a cover part 7 positioned thereon. The cover part 7 is provided on the outside with an integrated socket 8 for accommodating a connector (not shown) which serves for supplying electrical energy to the drive. The add-on housing 5, comprising the housing part 6 and the cover 7, is attached firmly to one of the end sides 1a of the frame 1, for example, it is clipped on via any conventional latching connection, (also not shown specifically). The add-on housing 5 thus forms a structural unit with the frame 1, with the structural unit projecting laterally only to a slight extent beyond the outer side of the frame.

Figure 2:
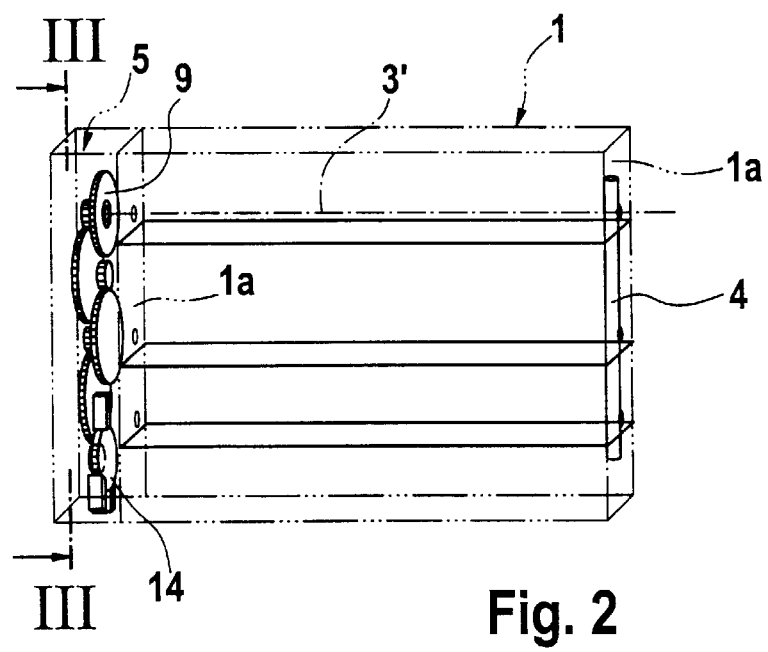
FIG. 2 is a view similar to FIG. 1, but with the paneling parts removed, in order to schematically show the construction of the add-on drive unit.
Figure 3:
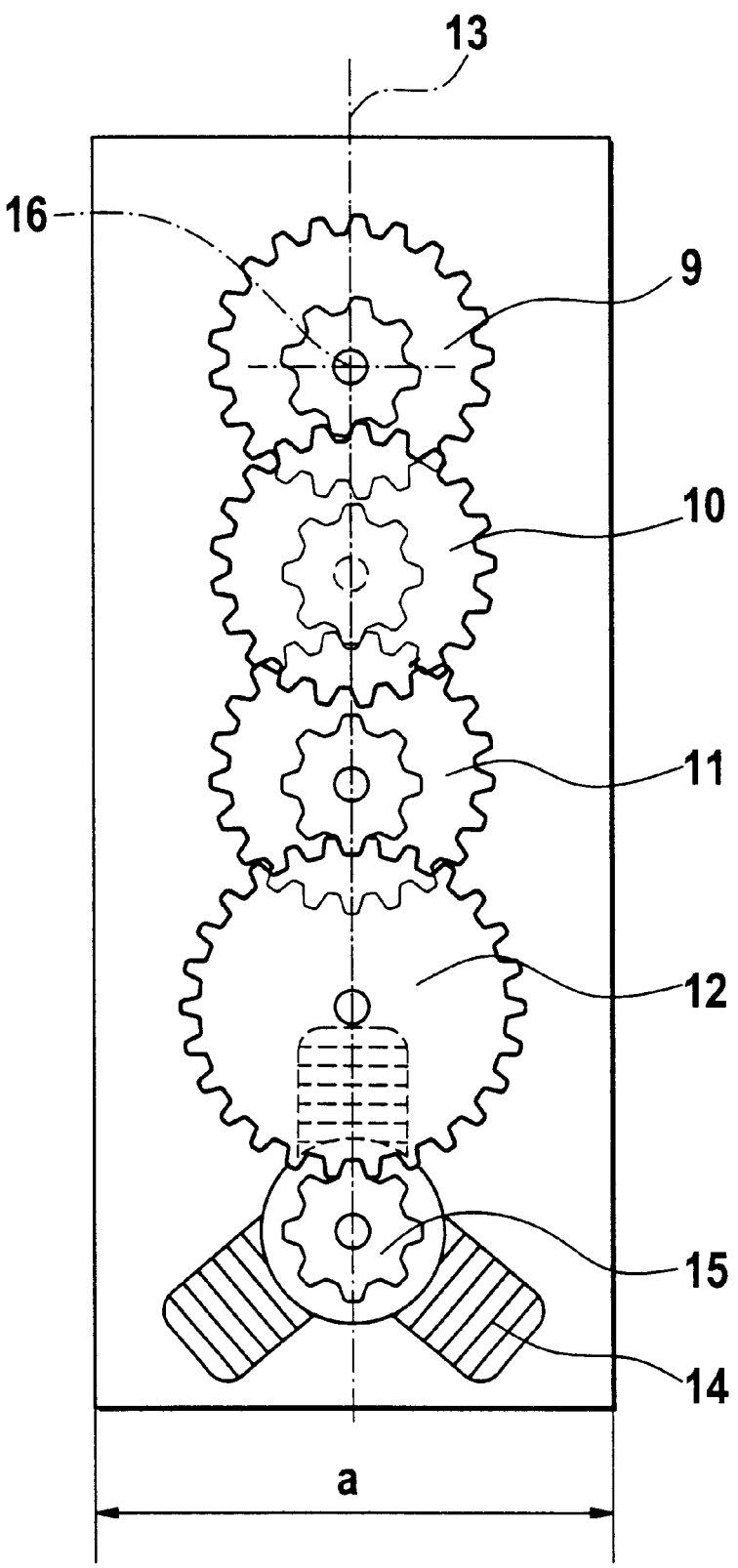
FIG. 3 is a schematic illustration showing an end view of the add-on drive unit with the outer paneling removed, as seen in the direction of section plane III—III according to FIG. 2.

FIGS. 2 and 3 show clearly the reduction-gear mechanism arranged within the add-on housing 5. Although being arranged with a relatively large vertical extent, the reduction-gear mechanism is of very narrow construction, with the result that it can be accommodated in the relatively flat add-on housing 5.

As FIGS. 2 and 3 show, a plurality of cylindrical gearwheels 9, 10, 11 and 12 are arranged one above the other such that their axles are located in a common plane 13 which, in the selected exemplary embodiment, also coincides with the plane in which the pivot spindles 3 of the lamellae 2 are arranged. A drive motor 14 in the form of a stepping motor is provided at the bottom end of this cylindrical-gearwheel arrangement and engages, by way of its pinion 15, in the outer toothing of the cylindrical gearwheel 12. The latter, in turn, engages with pinions of the cylindrical gearwheel 11, etc. The last cylindrical gearwheel 9 is thus driven from the motor 14 at a certain reduced speed. This cylindrical gearwheel 9 has its axle 16 connected to the pivot spindle 3' of the uppermost lamella 2'. The drive motor 14 is thus located on that side of the gear mechanism that is furthest away from the driven lamella 2'. This arrangement allows the construction of a reduction-gear mechanism which, although extending over the height of the side wall of the frame 1, does not have dimensions exceeding the outer dimensions of the side walls 1a. For this purpose, the largest diameter of the individual cylindrical gearwheels 9 to 12 is selected in each case such that it is smaller than the width a of the side wall 1a of the frame 1. The dimensions of the housing 5 are thus adapted to the dimensions of the side wall 1a.

Figure 4:
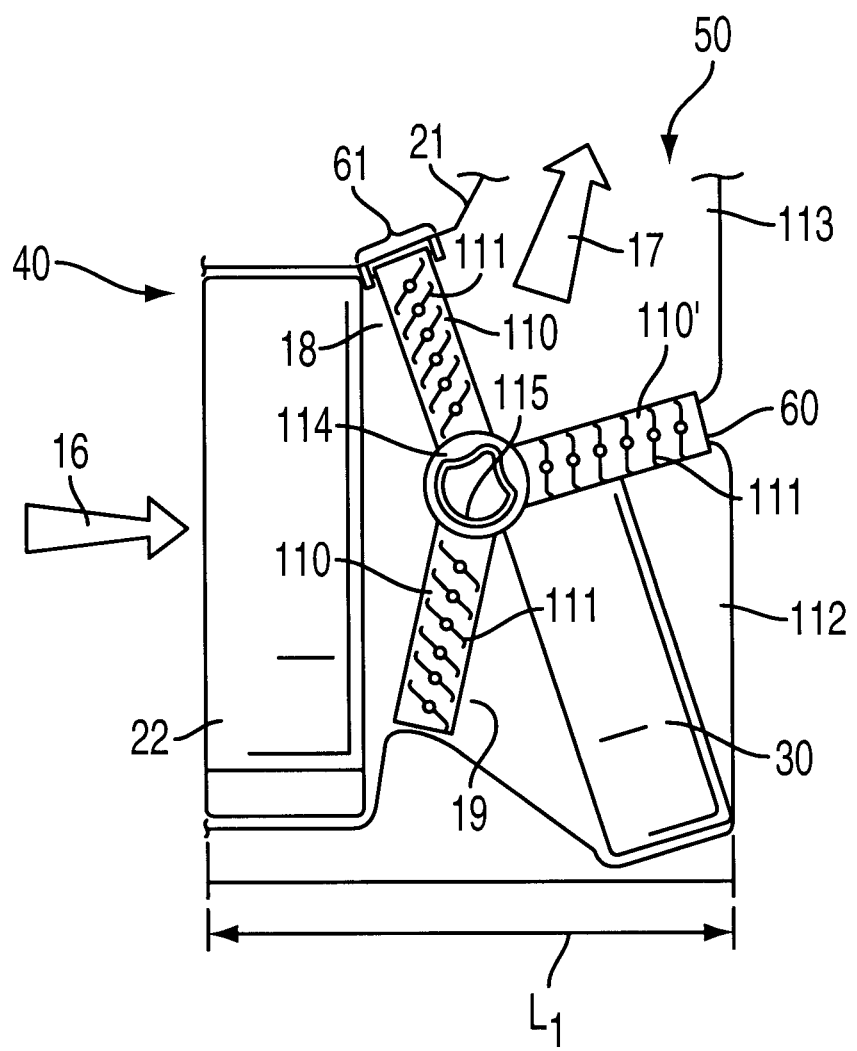
FIG. 4 is a diagrammatic longitudinal cross-section through a heating and/or air-conditioning installation for a motor vehicle according to the invention.

The diagrammatic representation of FIG. 4 shows a housing 21 of a heating and/or air-conditioning installation for a motor vehicle, including an evaporator 22 and a heater 30, as well as one or more air flow control devices according to the invention. The housing 21 comprises an inlet 40 and an outlet 50 for an air flow that is introduced into the housing 21 in the direction of arrow 16, aided for example by a blower, and that leaves the housing 21 in the direction of arrow 17 in order to be discharged into the passenger compartment of a motor vehicle in a manner not shown in detail. Between the inlet 40 and the outlet 50 there are provided, in this example, two flow paths in the form of channels 18 and 19. The arrangement is such that one of the channels 18 can be opened and closed by a mounting frame 110 with hinged lamellae 111, while the channel 19 can be opened and closed by a mounting frame 110 of substantially identical design and likewise provided with lamellae 111, as has been described in more detail above with reference to FIGS. 1–3. The channel 19 leads into a chamber 112 in which the heater 30 is arranged. The chamber 112 in its turn can be closed and opened, at its junction with the outlet chamber 113 extending next to the channel 18 behind the mounting frame 110, by another mounting frame 110' of principally the same design as the mounting frame 110 in the channels 18 and 19. The swing angle of the lamellae permits the air flow to be directed, whereby improved intermixing of two air flows can be achieved.

In the embodiment illustrated in FIG. 4, the three mounting frame 110 and 110' provided with the lamellae 111 are disposed in substantially star-like arrangement and can be introduced, in a direction perpendicular to the drawing plane, into mounting openings of the housing 21, or can be fitted in corresponding receiving pockets 61 during assembly of the housing. The lamellae of the mounting frame 110' are in their fully open position when the lamellae 111 of the mounting frame in channel 19 are in their fully open position. They are closed when the lamellae 111 of the mounting frame in the channel 19 are also closed and the lamellae 111 of the mounting frame 110 in channel 18 are in their fully open position.

The invention thus provide a compact add-on unit that can be adapted to the installation frame 1 of the control device and takes up only a small amount of additional space.

The disclosure of the priority application, German Patent Application No. 100 24 693.1, filed May 18, 2000, is hereby incorporated by reference in its entirety.

The foregoing embodiments have been shown and described for illustrative purposes only and are not intended to limit the scope of the invention which is defined by the claims. The invention includes all obvious modifications of the embodiments described above.

What is claimed is:

1. An air flow control device for controlling an air stream in a motor vehicle air-conditioning system, comprising:
   a mounting frame, said mounting frame having a width, height and depth of a size for installation in a duct of a motor vehicle air-conditioning system;
   a plurality of lamellae mounted pivotably at their ends in the lateral sides of the frame, the lamellae having dimensions selected such that, in a closed position, they close the through-passage cross section of the frame;
   a connecting member for connecting all of the lamellae together so that they are adjustable in the same direction;
   an add-on housing detachably connected to one of the lateral sides of the mounting frame to form a compact structural unit therewith;

an electric motor mounted in the add-on housing and having a drive output; and a reduction-gear mechanism comprising a plurality of cylindrical gearwheels arranged one above the other and of which the largest diameter is smaller than the axial depth of the frame, the reduction-gear mechanism being operatively attached to the drive output of the electric motor and having a final gearwheel that rotatably drives at least one of the lamellae.

2. A control device as claimed in claim 1, wherein the reduction-gear mechanism has a transmission ratio of approximately 300 to 750:1.

3. A control device as claimed in claim 1, wherein the cylindrical gearwheels have axles arranged in a plane that is located parallel to, or coincides with, a plane in which the pivot axes of the lamellae are located.

4. A control device as claimed in claim 1, wherein the electric motor is arranged at an opposite end of the add-on unit from at least one driven lamella.

5. A control device as claimed in claim 1, wherein the add-on housing has a width that is essentially equal to the axial depth of the frame.

6. A control device as claimed in claim 5, wherein the add-on housing has a height that is essentially equal to the height of the frame.

7. A control device as claimed in claim 1, wherein the add-on housing can be clipped laterally on the frame.

8. A control device as claimed in claim 1, wherein the electric motor comprises a stepping motor.

9. A control device as claimed in claim 1, wherein the add-on housing further comprises a receptacle for containing an electrical power supply plug for the electric motor.

10. A motor vehicle air-conditioning system, comprising a housing defining an air flow duct, an evaporator located in the housing, a heater located in the housing and an air flow control device positioned in the air flow duct, wherein the air flow control device comprises a device as claimed in claim 1.

11. A control device as claimed in claim 1, wherein said add-on housing has a width that does not significantly increase the width of the mounting frame.

12. A control device as claimed in claim 6, wherein said add-on housing has a width that does not significantly increase the width of the mounting frame.

13. A control device as claimed in claim 1, wherein the electric motor comprises a stepping motor having an output speed of between 700 and 1500 rpm, and wherein the reduction-gear mechanism has a transmission ratio sufficient to provide a speed at the final gearwheel of 2 rpm.

14. A control device as claimed in claim 1, wherein the reduction-gear mechanism includes at least three reduction gears.

15. A control device as claimed in claim 1, wherein the width of the air flow control device is substantially equal to the length of the lamellae plus the lateral dimension of the add-on housing, whereby the lateral dimension of the add-on housing is minimized to provide as compact as possible of an air flow control device.

16. In a motor vehicle air-conditioning system including a housing defining an air flow duct and at least one heat exchanger located in the housing, an air flow control device positioned in the air flow duct, comprising:

a mounting frame;

a plurality of lamellae mounted pivotably at their ends in the lateral sides of the frame, the lamellae having dimensions selected such that, in a closed position, they close the through-passage cross section of the frame;

a connecting member for connecting all of the lamellae together so that they are adjustable in the same direction;

an add-on housing detachably connected to one of the lateral sides of the mounting frame to form a compact structural unit therewith;

an electric motor mounted in the add-on housing and having a drive output; and a reduction-gear mechanism comprising a plurality of cylindrical gearwheels arranged one above the other and of which the largest diameter is smaller than the axial depth of the frame, the reduction-gear mechanism being operatively attached to the drive output of the electric motor and having a final gearwheel that rotatably drives at least one of the lamellae.

* * * * *